Patented Sept. 4, 1934

1,972,270

UNITED STATES PATENT OFFICE 1,972,270

QUINAZOLINE COMPOUNDS

Giacomo Maffei, Milan, Italy, assignor to the firm S. A. Ledoga Prodotti Chimici e Farmaceutici, Milan, Italy No Drawing. Application March 27, 1930, Serial No. 439,540. In Germany May 30, 1929

11 Claims. (Cl. 260—32)

A comparatively large number of quaternary bases derived from quinazolines is known; they form soluble salts with organic and inorganic acids.

It has now been found, according to this invention, that certain hitherto unknown quaternary bases of substituted dihydroquinazolines of the type 6-R,3-(4-R-phenyl-)3,4-dihydroquinazoline, in which R may represent an organic aliphatic or aromatic or the like radical, possess important physiological actions. The physiological action of these quaternary bases varies according to the substituents.

Preparations, in which the residue R represents, for example, $OC_2H_5$, can be employed as local anaesthetics. A particular advantage of employing the quaternary bases is that the salts possess an increased solubility and that the secondary toxic effects of the preparations are particularly small.

Preparations, in which the residue R consists, for example, of $CH_3$ (methyl), have a blood pressure-lowering action.

The most important quaternary bases of the aforesaid kind are derivatives of the general formula:

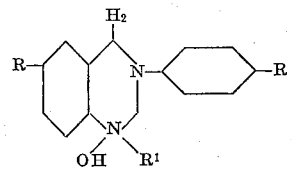

The residue R may consist of H, $CH_3$(methyl), $C_2H_5$(ethyl), $OCH_3$(methoxy), $OC_2H_5$(ethoxy) or a similar organic radical whilst R' represents a member selected from a saturated or unsaturated aliphatic group, for instance, $CH_3$(methyl), $CH_2CHCH_2$(allyl) or the $CH_2CH_2OH$(hydroxy ethyl) group or a phenyl ester of the latter. If the residue R represents H, i. e. if no substitution has taken place in the 6-position the physiological action only appears when $R^1$ has at least two carbon atoms. The hydroxy ethyl group in particular imparts a blood pressure-lowering action to the new preparations.

Substituted dihydroquinazolines of the general type 6.R.(4.R-phenyl)-3.4.dihydroquinazoline are employed as starting material. The products are prepared according to the usual methods by converting the said dihydroquinazolines into quaternary bases. Alkylation may, for example, be effected with aliphatic or aromatic halogen derivatives or dimethyl sulphate may be employed. It is understood that when the salts are produced, they are split, by the addition of alkali, for instance, potassium hydroxide, into bases, according to well known methods, in the following examples.

Examples 1. 29.6 parts of 6.ethoxy-3(4.ethoxyphenyl)-3.4.dihydroquinazoline are heated for a few hours with 14.19 parts of methyl iodide and 60 parts of ether to about 140° C. in an autoclave with stirring. The base is then liberated by means of alkali in the usual manner and extracted from the reaction mixture after which it is crystallized several times from alcohol. It forms white crystals having a melting point of 114° C. The structural formula of the end product is:

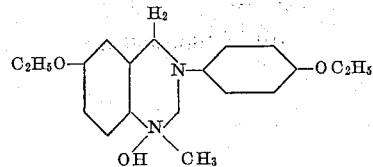

2. 23.6 parts of 6.methyl-3.(p-tolyl)-3.4.dihydroquinazoline are heated for a few hours with 12.09 parts of allyl bromide and 80 parts of benzene to about 100° C. to 120° C. in an autoclave with stirring. The base after liberation by means of alkali in the usual manner and extraction is recrystallized from various solvents until it shows a constant melting point of 110° C. The formula of the end product is:

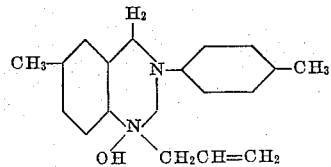

3. 23.6 parts of 6.methyl-3.(p-tolyl)-3.4.dihydroquinazoline are heated for a few hours with 8.05 parts of ethylene chlorhydrine to 130° C. to 140° C. The base after liberation by means of alkali in the usual manner and extraction is purified and crystallized as the chlorhydrate until it shows a constant melting point of from 214° C. to 215° C. The formula of the end product is:

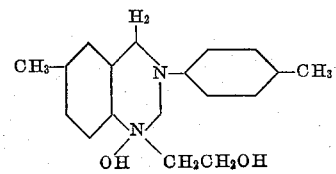

What I claim is:—

1. Quinazoline compounds of the general type corresponding to the graphic formula

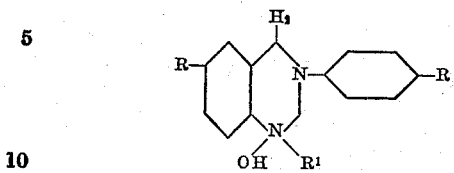

in which R is an alkyl or an alkoxy radical and R¹ is an alkyl or a hydroxy alkyl radical or a phenyl ester of the latter.

2. The product of claim 1 in which R and R¹ are both alkyl radicals.

3. The product of claim 1 in which R is an alkoxy and R' an alkyl radical.

4. The product of claim 1 in which R is an alkyl and R' a hydroxy ethyl radical.

5. Quinazoline compounds of the general type corresponding to the graphic formula

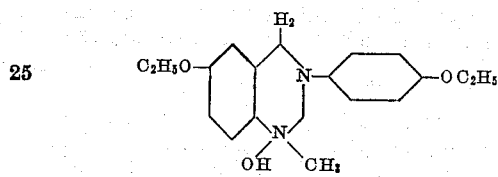

6. Quinazoline compounds of the general type corresponding to the graphic formula

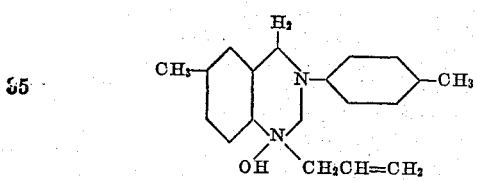

7. Quinazoline compounds of the general type corresponding to the graphic formula

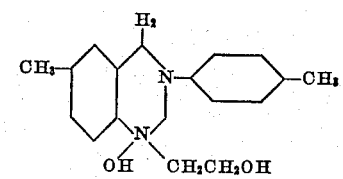

8. A process for preparing quinazoline compounds comprising converting dihydroquinazolines of the general type having the formula

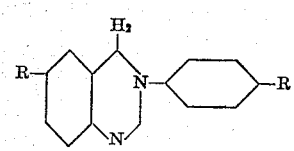

in which R is an alkyl or alkoxy radical, into quaternary bases by alkylating said compounds with an alkylating agent selected from the group consisting of aliphatic halides and dimethyl sulphate, splitting the salts formed by means of alkali and crystallizing out the bases.

9. The process of claim 8 in which the alkylating agent is methyl iodide.

10. The process of claim 8 in which the alkylating agent is allyl bromide.

11. The process of claim 8 in which the alkylating agent is ethylene chlorhydrine.

GIACOMO MAFFEI.